United States Patent [19]

Trumpf et al.

[11] 4,334,811
[45] Jun. 15, 1982

[54] SPINDLE EXTENSION, ESPECIALLY FOR DRILLING AND MILLING MACHINES

[75] Inventors: Jakob Trumpf, Buchs; Hansueli Keller, Hegnau, both of Switzerland

[73] Assignee: Werkzeugmaschinenfabrik Oerlikon-Bührle AG, Zürich, Switzerland

[21] Appl. No.: 185,529

[22] Filed: Sep. 9, 1980

[30] Foreign Application Priority Data

Oct. 12, 1979 [CH] Switzerland ............... 9206/79

[51] Int. Cl.³ .............................................. B23C 5/26
[52] U.S. Cl. ................................. 409/233; 409/239
[58] Field of Search ............ 409/233, 234; 29/568

[56] References Cited

U.S. PATENT DOCUMENTS 3,269,271 8/1966 Bruckner ..................... 409/233

FOREIGN PATENT DOCUMENTS 513793 5/1976 U.S.S.R. ..................... 409/233
656751 4/1979 U.S.S.R. ..................... 409/233

Primary Examiner—Z. R. Bilinsky
Attorney, Agent, or Firm—Werner W. Kleeman

[57] ABSTRACT

A spindle extension, especially for drilling and milling machines, is required when machining large size workpieces. In order to enable the automatic tool change also when there is mounted the spindle extension with the available tools, the inventive spindle extension is provided with a chucking clamp which possesses a chucking or clamping pin which can be engaged by the chucking clamp of the tool spindle.

2 Claims, 1 Drawing Figure

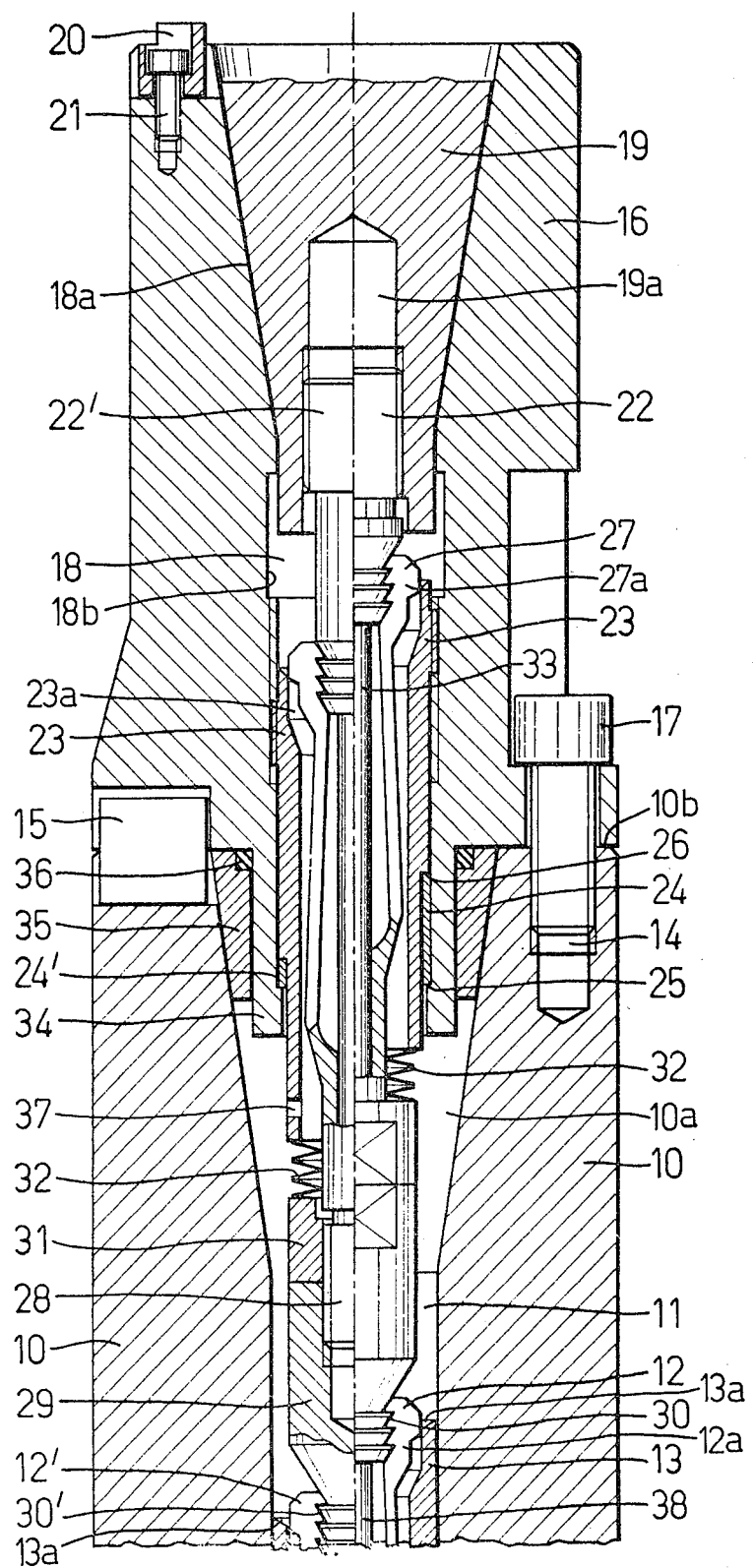

SPINDLE EXTENSION, ESPECIALLY FOR DRILLING AND MILLING MACHINES

BACKGROUND OF THE INVENTION

The present invention relates to a new and improved construction of a spindle extension, especially for drilling and milling machines, which contain a spindle with an automatic tool chucking or clamping device. The automatic tool chucking device contains a chucking clamp or clamping element. There is also provided a spindle extension piece or element which can be inserted into an inner cone or conical portion of the spindle and has an inner cone or conical portion for the reception of a tool cone of a tool.

There are known to the art spindle extensions for drilling and milling machines, wherein the tool is retained by means of threaded bolts or screws and no longer can be held by the automatic tool chucking or clamping mechanism, or wherein an elongated chucking or clamping pin must be attached to the tool, so that there can be used the automatic chucking or clamping device.

Different constructions of tool clamping devices are known to the art, for instance, from U.S. Pat. Nos. 3,177,775, 3,762,271, 3,797,956, 4,122,755, French Pat. Nos. 1,451,525, 1,452,753, 2,288,579, German Pat. No. 578,974 and the German language publication "Werkstatt und Betrieb", 109 (1976)10, the article entitled "Zeitgemässe Konzeption einer vertikalen Bohr und Fräsmaschine", appearing at pages 555 to 558.

SUMMARY OF THE INVENTION

Therefore with the foregoing in mind it is a primary object of the present invention to provide an improved spindle extension for machine tools which is not associated with the limitations and shortcomings of the prior art constructions.

Another and more specific object of the present invention is to provide an improved construction of spindle extension, wherein there can be employed the usual tools and where there is ensured for an automatic chucking of the tools.

Still a further significant object of the invention is to provide an improved construction of spindle extension which is easy to use, extremely reliable in operation, economical to manufacture, not readily subject to breakdown or malfunction, and requires a minimum of maintenance and servicing.

Now in order to implement these and still further objects of the invention which will become more readily apparent as the description proceeds, the spindle extension of the present development is manifested by the features that, the spindle extension element or piece possesses a chucking clamp for engaging the chucking pin or plug of a tool cone and which can be engaged by the chucking clamp or clamp member of the spindle.

BRIEF DESCRIPTION OF THE DRAWING

The invention will be better understood and objects other than those set forth above will become more readily apparent when consideration is given to the following detailed description of the drawing wherein in the single FIGURE there has been shown in axial longitudinal sectional view two exemplary embodiments of the inventive spindle extension.

DETAILED DESCRIPTION OF THE PREFERRED EMBODIMENTS

Describing now the drawing, the not particularly illustrated but conventional horizontal drilling and milling machine will be seen to contain a spindle 10, which in conventional manner is mounted in a likewise not particularly shown but standard headstock of the machine tool. The spindle 10 is hollow, i.e. it possesses a longitudinal bore 11. Within this bore 11 of the spindle 10 there is arranged a chucking clamp or clamping element 12 which serves to chuck or clamp a tool. A conventional and therefore not particularly illustrated chucking device having a hydraulic cylinder and clamping spring enables shifting the clamping or chucking element 12 within the bore 11. In the drawing the clamping element 12 has been shown in its rearmost position, and this holds true for both halves of the showing of FIG. 1, since in the right-hand portion of such Figure there has been illustrated a first embodiment having a somewhat longer chucking clamp or clamping element 12 and in the left-hand portion of the illustration there is shown a second exemplary embodiment with a somewhat shorter chucking clamp 12'. The chucking clamp 12 consists of a number of segments 12a, only one of which has been shown in the drawing. In the illustrated position the chucking clamp 12 is located within a sleeve which has a substantially conical bore 13a, by means of which the segments 12a of the chucking clamp 12 are pressed radially inwards when the chucking clamp 12 is moved by the aforementioned standard chucking or clamping spring into the illustrated rearmost position. If the chucking clamp 12 is moved forwards by means of the mentioned hydraulic cylinder, i.e. upwardly in the plane of the drawing, then it moves out of the conical bore 13a of the sleeve or sleeve member 13 and the segments 12a of the chucking clamp 12 can move radially outwards and release the tool.

This clamping and releasing of the tool with the aid of the clamping element or chucking clamp 12 constitutes part of the the state-of-the-art and thus need not here be further considered, particularly since those acquainted with this art are quite familiar with such operations. The spindle 10 possesses at its forward end, i.e. at its upper end of the showing of the drawing, a number of threaded bores 14 and groove blocks 15 or equivalent structure. There are preferably provided four threaded bores 14 and two groove blocks 15 which are uniformly distributed about the circumference of the spindle 10. In the drawing there is, however, only visible one threaded bore 14 and one groove block 15. The threaded bores 14 enable the attachment of heavy tools and the groove blocks 15 secure all of the tools against any unintentional rotation.

According to the present invention there is attached to the spindle 10 a spindle extension element or piece 16 with the aid of the threaded bolts 17 or equivalent structure, wherein the threaded bolts 17 are threaded into the aforementioned threaded bores 14 which are provided on each spindle 10. By means of the groove blocks 15 the spindle extension element 16 is secured against unintentional rotation.

Just as was the case for the spindle 10 also the spindle extension element or piece 16 has a longitudinal bore 18 which widens upwardly. This conical widened portion 18a of the longitudinal bore 18 serves for the reception of a tool, wherein in the drawing there has only been shown a tool cone or conical portion 19. At this tool cone 19 there is secured in conventional manner, and therefore not here further shown, a suitable tool, for instance, a drill. At the upper end of the spindle extension element 16 there are likewise secured groove blocks 20 with the aid of the threaded bolts 21 or the like. In the drawing there is again only visible one groove block 20. The groove blocks 20, like the groove blocks 15, serve for securing the tool cone 19 against any unintentional rotational movement. In a longitudinal bore 19a of the tool cone 19 there is threaded therein a chucking or clamping pin or plug 22. In the right-hand half of the drawing there is illustrated a shorter clamping pin or plug 22 according to a first embodiment of the invention and in the left-hand half of the drawing there has been illustrated a longer clamping pin 22' according to a second embodiment of the invention.

Within a cylindrical portion 18b of the spindle extension element 16 there is threaded a bushing 23 which has a conical bore 23a, just as was the case for the above described sleeve 13. This bushing 23 has been shown in the right-hand portion of FIG. 1, according to the first embodiment, threaded less deeply into the spindle extension element 16 than in the embodiment shown in the left-hand portion of FIG. 1. In order to realize this, there is provided for the first exemplary embodiment a longer spacer sleeve 24 than for the second embodiment where there is provided a shorter spacer sleeve 24'. Each such sleeve, such as the spacer sleeve 24, bears at one end at a shoulder 25 of the spindle extension element 16 and at the other end at a shoulder 26 of the bushing 23. As will be readily evident from the drawing, all parts of the spindle extension 16 are the same in their construction with the exception of the respective spindle sleeve 24 and 24' for the two embodiments herein disclosed. This is especially so for the above described bushing 23. Within this bushing 23 there is located a clamping element or chucking clamp 27. The chucking clamp 27 has at its upper end a number of segments 27a which are identically constructed as the segments 12a of the clamping chuck 12. The segments 27a of the chucking clamp 27 are formed of one-piece with a threaded bolt 28 provided at the lower end of the chucking clamp 27. Fixedly screwed onto this threaded bolt 28 is a nut member 29 which has a chucking or clamping pin 30 at its lower end. This clamping or chucking pin 30 engages with the above-described clamping element or chucking clamp 12 of the spindle 10. A counter nut member 31, which likewise is screwed onto the threaded bolt 28, serves to secure the nut member 29 upon the threaded bolt 28. Between the counter nut member 31 and the bushing 23 threaded into the spindle extension element 16 there is arranged a package of springs 32. This spring packet or package of plate springs 32 strives to draw the chucking clamp 27 into the conical bore 23a until the clamping element or chucking clamp 27 bears against the wall of such conical bore 23a.

Between the segments 27a of the chucking clamp 27 there is arranged an ejection or ejector rod or tube 33 which is anchored at its lower end in the threaded bolt 28 of the chucking clamp 27. If the chucking clamp 27 is moved towards the front, i.e. upwardly in the drawing, then the ejector tube or rod 33 impacts against the clamping pin 22, so that the tool cone 19 along with the tool is ejected out of the spindle extension element 16. Such an ejector tube or rod 38 is also provided for the chucking clamp 12, by means of which there can be upwardly displaced the clamping or chucking pin 30.

At the rear end of the spindle extension element 16 there is provided a cylindrical projection or extension 34 upon which there is non-rotatably mounted and for limited axial displacement a sleeve member 35 which externally has a substantially conically shape. This conical sleeve member 35 ensures for an exact centering of the spindle extension element 16 in the conical bore 10a of the spindle 10 and additionally ensures for an exact bearing or contact of the spindle extension piece or element 16 at the end surface or face 10b of the spindle 10. This is particularly realised through the use of an elastic sealing ring 36. So that the tool cone 19 exactly bears at the conical part 18a of the bore 18 of the spindle extension element 16 the surface is cleaned with compressed air. In order that the compressed or pressurized air can arrive from the spindle-lengthwise bore 11 at the lengthwise or longitudinal bore 18 of the spindle extension element 16, the sleeve member or bushing 23 is provided at its rear end with at least one bore or passage 37.

Having now had the benefit of the foregoing discussion of the two exemplary embodiments of spindle extensions their mode of operation will now be considered and is as follows:

In the event there is required for longer workpieces, for instance, for those having long bores, the spindle extension, then the spindle extension piece 16 is threaded or bolted onto the spindle 10 with the aid of the four threaded bolts 17 and the threaded bores 14. The externally conically configured sleeve member 35 is thus resiliently pressed by means of the sealing ring 36 into the internal cone or conical portion 10a of the spindle 10. Under the action of the force of the package of plate springs 32 the chucking clamp 27 is held in its rearward position, i.e. in the showing of FIG. 1 in its lowermost position. In this way there is ensured that the chucking clamp 12 of the spindle 10 can reliably engage the chucking pin 30.

In order to fixedly clamp the tool cone 19, the chucking clamp 12 is moved upwardly by means of the ejector rod 38, so that the chucking clamp 12 opens and the chucking or clamping pin 30 is upwardly displaced by the action of the ejector rod 38. By means of the chucking pin 30 the chucking clamp 27 of the spindle extension is also upwardly displaced. In the opened chucking clamp 27 there now can be inserted the chucking pin 22 of the tool cone 19. Thereafter, by means of the not particularly illustrated clamping spring the chucking clamp 12 is moved back into its starting position, where it is closed under the action of the sleeve 13, and such chucking clamp 12 now comes into engagement with the chucking pin 30 which likewise is retracted. Thus, also the chucking clamp 27 is retracted and closed under the action of the bushing 23. Hence, the chucking clamp 27 comes into engagement with the chucking or clamping pin 22 of the tool cone 19 which is drawn into the inner cone or conical portion 18a of the spindle extension element 16 and is fixedly clamped or chucked.

As to the ejection operation it will be apparent and understood that this occurs in the reverse sequence.

While there are shown and described present preferred embodiments of the invention, it is to be distinctly understood that the invention is not limited thereto, but may be otherwise variously embodied and practiced within the scope of the following claims. Accordingly,

What we claim is:

1. A spindle extension, especially for a drilling and milling machine, comprising:
   a spindle provided for an automatic tool chucking device,
   a chucking clamp provided for said spindle,
   a spindle extension element,
   said spindle being provided with an internal conical portion for receiving therein part of the spindle extension element,
   said spindle extension element having an internal conical portion adapted to receive a tool cone of a tool,
   said tool cone having a clamping pin,
   said spindle extension element being provided with a clamping chuck for engaging said clamping pin of the tool cone,
   said clamping chuck being provided with a clamping pin engageable by the chucking clamp of the spindle,
   said clamping chuck together with said clamping pin of said spindle extension element being arranged to be displaceable within said spindle extension element,
   spring means,
   a bushing secured within the spindle extension element,
   a nut member provided for the clamping pin engageable by the chucking clamp of the spindle,
   said spring means bearing at one end at said bushing and at the other end at said nut member, and
   said spring means striving to retain said clamping chuck in a rearward position.

2. The spindle extension as defined in claim 1, wherein:
   said spindle extension element has a rear end which is provided with a substantially cylindrical extension,
   an externally substantially conically configured sleeve non-rotatably mounted upon said cylindrical extension and arranged to be axially displaceable thereon to a limited degree, and
   said conically configured sleeve serving to center said spindle extension element within the internal conical portion of said spindle.

* * * * *